United States Patent [19]

Thornburrow

[11] 4,046,740
[45] Sept. 6, 1977

[54] NOVEL POLYESTER COMPOSITIONS

[75] Inventor: Peter Robert Thornburrow, South Glamorgan, Wales

[73] Assignee: BP Chemicals Limited, London, England

[21] Appl. No.: 678,701

[22] Filed: Apr. 20, 1976

[30] Foreign Application Priority Data

May 1, 1975 United Kingdom ............ 18198/75

[51] Int. Cl.$^2$ .................. C08G 63/12; C08L 67/06
[52] U.S. Cl. ..................... 260/75 N; 260/75 UA; 260/577; 260/863; 260/864
[58] Field of Search ............. 260/863, 864, 75 UA, 260/75 N, 577

[56] References Cited

U.S. PATENT DOCUMENTS

| 3,367,994 | 2/1968 | Parker et al. | 260/864 |
| 3,504,033 | 3/1970 | Ailman | 260/577 |
| 3,522,309 | 7/1970 | Kirby | 260/577 |
| 3,541,153 | 11/1970 | Sandridge | 260/577 |
| 3,546,295 | 12/1970 | Maravetz | 260/577 |
| 3,558,706 | 1/1971 | Hamilton | 260/577 |
| 3,644,612 | 2/1972 | Meyer et al. | 260/864 X |
| 3,689,513 | 9/1972 | Cain et al. | 260/577 X |
| 3,950,287 | 4/1976 | Coats et al. | 260/864 X |
| 3,957,874 | 5/1976 | Dockner et al. | 260/577 |
| 4,012,512 | 3/1977 | Oswitch et al. | 260/75 N X |

B 326,211  3/1976  Watts et al. .................. 260/864 X

OTHER PUBLICATIONS

Chem. Abs. 75:50095d; 75:21605q; 73:p46223k; 75:p99569j; 72:122021q; 70:88622h; 70:p20657t; 68:40620n; 67:12047s; 66:p66167d.
Thomas et al. Alkylation of Amines in J.A.C.S. 68, 895 (1946).

Primary Examiner—Murray Tillman
Assistant Examiner—T. DeBenedictis, Sr.
Attorney, Agent, or Firm—Brooks, Haidt, Haffner & Delahunty

[57] ABSTRACT

Unsaturated polyester resin compositions contain an amine accelerator of formula

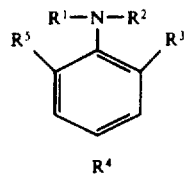

wherein $R^1$ and $R^2$ are alkyl, hydroxyalkyl or carboxyalkyl groups and $R^3$, $R^4$ and $R^5$ are alkyl, aralkyl, cycloalkyl, alkoxy or halogen groups.

5 Claims, No Drawings

NOVEL POLYESTER COMPOSITIONS

This invention relates to methods of effecting cure of polyester resins and to the production of polymerisable polyester compositions suitable for rapid curing. More particularly, the invention relates to methods of effecting gelation and final cure of certain peroxycatalysed unsaturated polyester resin compositions by the use of specific substances that cause the acceleration of the function of the catalysts, and to the production of unsaturated polymerisable polyester compositions containing such catalyst accelerators and suitable for rapid gelation and final curing by the incorporation therewith of a peroxy catalyst.

The term "unsaturated polyester" is used herein in the general sense it now conveys in the art; namely, to refer generally to a polymerisable unsaturated polycarboxylic acid-polyhydric alcohol polyester, which is prepared by an esterification reaction between one or more polybasic acids, at least one of which is unsaturated and one or more polyhydric alcohols. Unsaturated polyester resin compositions preferably contain a monomeric substance that contains at least one $CH_2 = C<$ group that is copolymerisable with the polyester.

In general, unsaturated polyester resin compositions of the type referred to cure or harden very slowly. However, it has been conventional in the art for some time to add a catalyst, usually some type of peroxy compound, prior to use of the polyester composition, whereby the rate of cure is greatly increased. As a result, polyester resin compounds have found wide applicability in moulding, laminating, casting, coating and other fields.

Peroxy compounds, when used as catalysts for unsaturated polyester resin compositions, initiate the formation of free radicals which, in turn, hasten hardening or cure by increasing the rate of final polymerisation of such compositions through their olefinic unsaturated double bonds. The production of free radicals may be increased by heating the composition. Some peroxy catalysts are more active than others and may not require the addition of heat to initiate their decomposition.

However, in many cases, means other than heat, or in addition thereto, are used for inducing decompositions of the peroxy compounds and thereby accelerate the catalytic action thereof. Such other means include the use of certain compounds that induce the decomposition of peroxy compounds and which have come to be known as "promoters" or "accelerators" therefor.

Thus when effecting the cure of unsaturated polyester resin compositions in the cold, i.e. at ambient temperatures, it is customary to use either a cobalt salt (e.g. octoate) with an organic hydroperoxide (e.g. methyl ethyl ketone peroxide) or a tertiary aromatic amine (e.g. N,N-dimethyl aniline) with a diacyl peroxide (e.g. benzoyl peroxide) as curatives. Furthermore, a tertiary amine may be used in addition to cobalt octoate, in order to achieve a faster cure rate with some peroxides, e.g. methyl ethyl ketone peroxide. Many amines can be used in this way and many examples are well known and widely used e.g. N,N-dimethyl aniline, N,N-diethyl aniline, N,N-dimethyl-p-toluidine and ethyl phenyl ethanolamine. Such amines may contain functional groups which allow the amine to be incorporated into the polyester chain during the condensation reaction, for example, phenyl diethanolamine and aniline - N,N-diacetic acid. All these tertiary aromatic amines however, have the disadvantage of producing dark colours in the cured resins and products incorporating then darken further on weathering. Their use is, therefore, restricted to applications in which good (pale) colours are unimportant.

An object of the present invention is to provide an improved amine-based accelerator for unsaturated polyester resin compositions.

Accordingly the present invention provides an unsaturated polyester resin composition which comprises an unsaturated polyester, a soluble cobalt salt, an amine accelerator having the formula

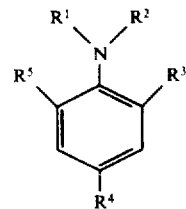

where $R^1$, $R^2$ are alkyl, hydroxyalkyl or carboxy alkyl groups and $R^3$, $R^4$ and $R^5$ are alkyl, aralkyl, cycloalkyl, alkoxy or halogen groups, and a peroxy initiator that is accelerated by said amine.

Any unsaturated polyester may be used. Suitably the polyester is a condensation product of a glycol with a mixture of an $\alpha$, $\beta$-unsaturated dibasic acid or anhydride (for example maleic anhydride or fumaric acid) and a saturated dibasic acid or anhydride such as phthalic acid, possibly modified by the presence of small amounts of a polyhydric alcohol (for example pentaerythritol). Examples of suitable copolymerisable monomeric materials are styrene vinyl toluene and diallyl phthalate. Such polyesters and suitable monomeric materials are described in British Pat. Nos. 497,175; 592,046; 540,169 and 656,138. Solutions of the unsaturated polyester in a copolymerisable monomer such as styrene are frequently referred to as polyester resins.

The polyester resin can contain polymerisation inhibitors, anti-oxidants etc., to improve the pot life of the compositions. Examples of suitable inhibitors are hydroquinone, quinones, e.g. 2,5-di phenyl benzoquinone.

Fillers for polyester compounds are well-known and usually consist of finely divided minerals. They may be present in compositions according to the present invention.

The compositions according to the present invention must contain a soluble cobalt salt. Such salts are well-known promoters in unsaturated polyester resin technology. Examples are cobalt octoate or naphthenate.

The amine accelerators have the formula given above. Preferably the alkyl or substituted alkyl groups forming the various R groups have six or less carbon atoms. Examples of suitable amines are N,N-dimethyl-2,4,6-trimethyl aniline, N,N-diethyl-2,4,6-trimethyl aniline, N,N-di(hydroxy ethyl)-2,4,6-trimethylaniline, N,N-di(hydroxypropyl)-2,4,6-trimethylaniline. The preparation of such compounds presents no difficulties. Thus N,N-dimethyl-2,4,6-trimethyl aniline may be prepared by treating 2,4,6-trimethyl aniline with trimethyl phosphate (see J. Amer Chem. Soc 68 895, 1946).

A wide variety of known peroxy compounds can be used in compositions according to the present invention, but it is found that in some cases the acceleration effect is not sufficiently great to provide a paractical curative system. For example N,N-dimethyl, 2,4,6-trimethyl aniline does not bring about a worthwhile acceleration of the action of benzoyl peroxide in the presence of the cobalt salt. Simple tests can readily determine whether or not a given combination of cobalt salt, amine and peroxy compound form a useful combination. Preferred initiators are methyl ethyl ketone peroxide, acetylacetone peroxide, cyclohexanone peroxide, methyl isobutyl ketone peroxide.

The cobalt salt, the amine accelerator and the peroxy initiator are present in compositions according to the present invention in amounts that are conventional for metal promoters, amine accelerators and peroxy initiators in unsaturated polyester resin compositions. Thus the amine accelerator may be present in an amount by weight based on the weight of the monomeric material i.e. polyester and copolymerisable monomer (if any), of 0.001 to 1%. Similarly the range of suitable amounts of peroxy initiator and cobalt salt are respectively in the range 0.25 to 5% by weight and 10 to 1000 parts (as metal) per million, based on the monomeric material. By suitable adjustment of the quantities of cobalt salt, accelerator, peroxy initiator and inhibitors (if present) the gel and cure times of the compositions can be controlled.

The compositions can be prepared by mixing the various components together by any suitable means. Preferably the amine accelerators are added to the compositions at any stage prior to the addition of the peroxy initiator. The amine accelerators, if they contain suitable substituent groups, e.g. hydroxyl or carboxyl groups, may chemically be bonded in the unsaturated polyester if they are present in the esterification reaction mixture in which the polyester is formed.

The unsaturated polyester resin compositions according to the present invention combine rapid cure times with the ability to produce cured products having outstanding resistance to colour change on exposure to atmospheric conditions. They have many applications such as, for example in the production of roof sheets, resinject systems, exterior panels and others requiring rapid cure for quick mould release.

The following example illustrates the properties of unsaturated polyester resin compositions according to the present invention and of the cured products derived therefrom.

EXAMPLE

A conventional unsaturated polyester was prepared from maleic anhydride, phthalic anhydride and propylene glycol (molar proportions 1:1:2) and dissolved in styrene to about 60% solids content. Conventional inhibitors (hydroquinone and p-tertiary butyl catechol) were present and, as accelerator, 150 ppm of cobalt (as octoate) was added.

Curing Properties obtained in 50 g casts

The gel times were determined on 50 gram samples at 25° C. Catalysts was added and the mixture placed in an air bath at 25° C with occasional stirring. The gel point is reached when the sample no longer flows but snaps.

N,N-dimethyl-2,4,6-trimethyl

| aniline concn. (%) | 0 | 0.01 | 0.05 | 0.1 | 0.15 |
|---|---|---|---|---|---|
| Gel time at 25° C (1% Butanox M50*) (min) | 22.75 | 12.8 | 5.5 | 4.5 | 3.5 |
| Time from gel time to peak exotherm temperature (min) | 28 | 19.2 | 7.5 | 7.5 | 5 |
| Peak Exotherm temperature (° C) | 117 | 102 | 128 | 129 | 123 |
| Stability at 60° C (days) | 28 | 28 | 17 | 11 | — |

*Butanox M50 (Registered Trade Mark) is a high activity methyl ethyl keton peroxide ex. Akzo Chemie (composition is 50% active).

Weathering behaviour

Three-ply laminates were prepared using the above resin (a) without amine, (b) with 0.15% N,N-dimethyl aniline, (c) with 0.15% ethyl phenyl ethanolamine and (d) with 0.15% N,N-dimethyl-2,4,6-trimethyl aniline as accelerators. The laminates were prepared by conventional means using chopped glass strand mat and rollers for incoporation of the resin; (glass contents of the laminates were 30± 4%). The laminates were cured at room temperature overnight followed by post curing at 80° C for four hours, The colours of the cured laminates were in the order:

N,N-dimethyl aniline (worst discolouration) ethyl phenyl ethanolamine and (N,N-dimethyl-2,4,6-trimethyl aniline) and control with no amine best.

Laninates (b) and (c) showed some discolouration after 1800 hours' exposure in a U.V. weatherometer whereas laminates (a) and (d) showed no discolouration.

I claim:

1. An unsaturated polyester resin composition which comprises an unsaturated polyester, a soluble cobalt salt, an amine accelerator having the formula

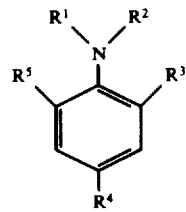

where $R^1$, $R^2$ are selected from the radicals alkyl, hydroxyalkyl and carboxy alkyl groups and $R^3$, $R^4$ and $R^5$ are selected from the radicals alkyl, aralkyl, cycloalkyl, alkoxy and halogen groups, and a peroxy initiator that is accelerated by said amine.

2. An unsaturated polyester resin composition as claimed in claim 1 wherein the polyester is a condensation product of a glycol with a mixture of a substance selected from an α, β-unsaturated dibasic acid and its anhydride together with a substance selected from a saturated dibasic acid and its anhydride.

3. An unsaturated polyester resin composition as claimed in claim 1 wherein the soluble cobalt salt is selected from cobalt octoate and cobalt naphthenate.

4. An unsaturated polyester resin composition as claimed in claim 1 wherein the amine accelerator is selected from N,N-dimethyl-2,4,6-trimethylaniline, and N,N-di(hydroxypropyl)-2,4,6-trimethyl aniline.

5. An unsaturated polyester resin composition as claimed in claim 1 wherein the peroxy initiator is selected from methyl ethyl ketone peroxide, acetylacetone peroxide, cyclohexanone peroxide and methyl isobutyl ketone peroxide.